Figure 1:
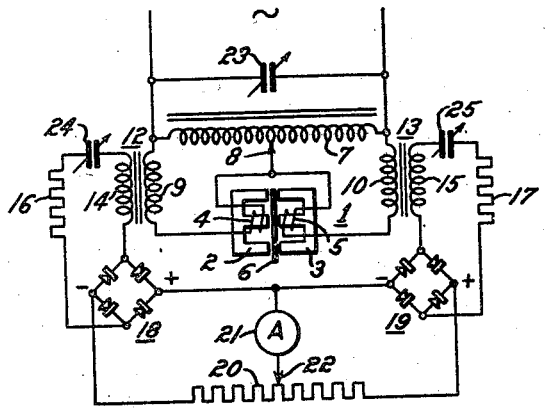

Jan. 13, 1948.  T. E. BROWNE, JR  2,434,547
ELECTRICAL GAUGE CIRCUIT
Filed July 27, 1945

WITNESSES:
Wm. B. Sellers.
C. F. Oberheim.

INVENTOR
Thomas E. Browne, Jr.
BY
Paul E. Friedemann
ATTORNEY

Patented Jan. 13, 1948

2,434,547

UNITED STATES PATENT OFFICE 2,434,547

ELECTRICAL GAUGE CIRCUITS

Thomas E. Browne, Jr., Pittsburgh, Pa., assignor to Westinghouse Electric Corporation, East Pittsburgh, Pa., a corporation of Pennsylvania Application July 27, 1945, Serial No. 607,433

7 Claims. (Cl. 177—351)

The present invention relates generally to systems for indicating or measuring the deflection or strain of a member subject to a stress.

More particularly, the present invention relates to a system of the character mentioned which employs a magnetic strain gauge as the strain sensitive element to produce a voltage or current or a change in voltage or current which is indicative of the deflection being measured, the strain gauge in most applications being secured directly to the member under stress so that the strain gauge elements may be subjected to movements equivalent to the deflections of the stressed member.

In certain of its aspects this invention is related to a copending application of Bernard F. Langer, Serial No. 534,223, filed May 5, 1944, entitled Strain measuring systems and assigned to the same assignee as this invention. This invention in a manner similar to that of the mentioned copending application provides compensation for various unwanted electrical effects, most of which have their source externally of the system, to provide an electrical response which for all practical purposes is a linear function of the strain being measured.

One object of this invention is to provide a strain measuring circuit embodying a variable reactor as the strain sensitive element in which the electrical response of the circuit is a linear function of the change in electrical properties of the variable reactor.

Another object of this invention is to provide a strain measuring circuit which is relatively free from electrical response to such variants as applied potential, temperature, etc.

Yet another object of this invention is to provide an electrical circuit adapted for measuring mechanical displacements which is normally electrically balanced and is electrically unbalanced only in response to the mechanical displacement.

A further object of this invention is to provide an electrical circuit adapted for measuring mechanical displacements embodying alternating current to direct current measurement of electrical quantities representative of strain in which, rectifiers of the contact type such as copper oxide or selenium are employed as the rectification medium, which is so arranged that sufficiently high base currents circulate in the rectifiers that operation thereof over their stable resistance range obtains.

A still further object of this invention is to provide a system for the measurement of mechanical displacements of the character described in the preceding object adapted for measuring positive and negative mechanical displacements in which the rectifier units operate at a high base current level over the entire displacement range.

Figure 2:
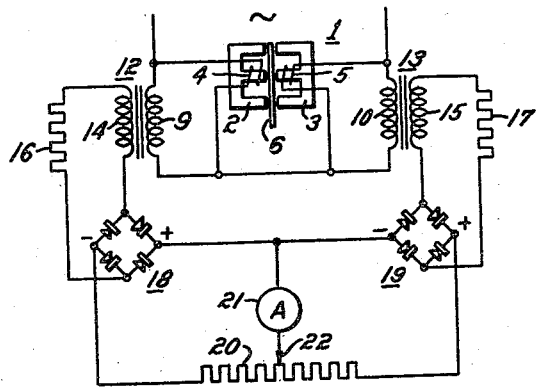
Figure 3:
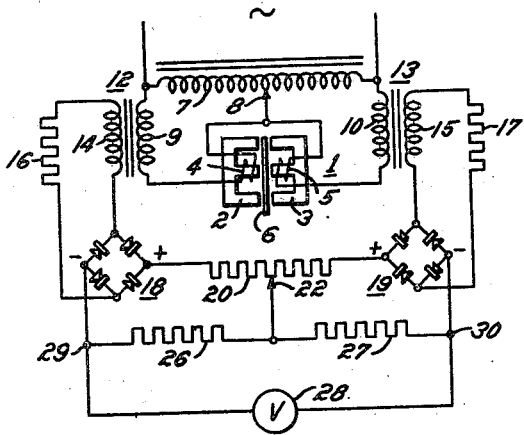

Other objects and advantages will become apparent from a study of the following disclosure when considered in conjunction with the accompanying drawing, in which:

Fig. 1 is a strain measuring circuit embodying the principles of this invention, Fig. 2 is a modification of the invention of Fig. 1, and Fig. 3 is a further modification of the invention of Fig. 1.

The invention as illustrated in Fig. 1 utilizes a reactor 1 as the displacement sensitive element. This reactor includes a pair of E-shaped core members 2 and 3 usually of laminated iron construction about the center legs of which are wound the coils 4 and 5. The core members 2 and 3 are disposed with their extremities in confronting relation and an armature 6 is disposed in the airgaps between the confronting core faces. The reluctances of the magnetic circuits of the cores 2 and 3 are simultaneously oppositely varied upon movement of the armature 6 lengthwise of the airgaps, that is, in a direction to decrease the set of airgaps associated with one core while increasing the set of airgaps associated with the other core. As a consequence the reactor coil impedances vary oppositely. In the measurement of mechanical displacements of relatively movable bodies the cores 2 and 3 are rigidly attached to one body and the armature attached to the remaining body. In the measurement of strain the cores and armature are attached at displaced points of the body, the distance between the points constituting a known gauge length over which the strain is to be measured.

The reactor coils 4 and 5 are arranged in adjacent legs of a conventional electrical bridge circuit which has for its remaining two adjacent legs the tapped sections of the autotransformer 7 determined by the position of the movable contact 8 for bridge balance. The bridge is energized by a suitable source of alternating current indicated by the sinusoidal wave.

Primary windings 9 and 10 of the isolation transformers 12 and 13 are respectively connected in series with the reactor coils 4 and 5 in their respective bridge circuit legs and the secondary windings 14 and 15 are respectively connected together with series resistors 16 and 17 across the alternating current sides of the full wave rectifiers 18 and 19. The direct current sides of the rectifiers are connected in a series loop which includes the series resistor 20 and a direct current measuring instrument 21 is connected across the series loop at the resistor 20 with the adjustable tap 22 so set as to provide zero instrument current when the electrical bridge circuit is balanced or, as in some applications for a predetermined amount of bridge unbalance.

Thus this circuit arrangement provides a pair of circuits which respond to variations in electrical characteristic of the bridge legs containing the reactor coils and which have their outputs opposed across the terminals of the instrument 21. Isolation transformers 12 and 13 in addition to isolating the instrument circuits from the bridge circuit provide a convenient means for matching instrument circuit impedance with bridge circuit impedance to obtain the maximum input to the metering circuit for the available bridge circuit electrical change. Resistors 16 and 17 minimize the effect of resistance changes of the rectifiers 18 and 19 resulting from temperature changes. Their resistance is considerably higher than the rectifier resistance and as a consequence the change in rectifier resistance with temperature represents only a second order change. Resistor 20 is of a sufficiently high value to make the resistance of the series loop including the rectifiers 18 and 19 of a value higher than the instrument 21, for the purpose of obtaining sufficient sensitivity in the instrument circuit. If this resistor is not provided, the two rectifiers when connected in series are, in effect, short circuited. Thus, even if the instrument circuit were to have a very low resistance, the current flow through the instrument would be small and the sensitivity of the instrument to changes in current resulting from electrical changes in the reactor bridge circuit would be correspondingly small. Condensers 23, 24 and 25 are utilized in the usual manner for power factor correction in order to get the maximum output current variation for a given current input.

The embodiment of the invention illustrated in Fig. 2 differs from that of Fig. 1 mainly in the elimination of the autotransformer 7. The coils 4 and 5 of the variable reactor are connected in parallel with the primary windings 9 and 10 of the isolation transformers. This, in effect, forms a bridge circuit in which the currents traversing the transformer primary windings are varied simultaneously in opposite directions depending upon the oppositely changing impedances of the parallel reactor circuits. As a consequence the electrical quantities available at the direct current sides of the full wave rectifiers 18 and 19 are varied in an opposite sense and the electrical difference indicated at the instrument 21. In this figure, parts which function in the manner of similar parts of Fig. 1 have been given like reference characters and the details of this embodiment of the invention will be understood in connection with the discussion relating to Fig. 1. It will be apparent that imperfect matching of the transformer primaries and the reactor coils may be compensated by adjustment of the tap 22 along the resistor 20 to obtain zero meter deflection for the center position of the reactor armature 6, or, similarly, zero meter deflection may be obtained for any off-center position of the armature 6.

The embodiment of the invention illustrated in Fig. 3 utilizes the reactor bridge circuit illustrated in Fig. 1. The circuit differences reside in the addition of certain resistors in the metering circuit and reversal of the relative polarity of the rectifier outputs whereby a high impedance or voltmeter type of instrument may be used. This is accomplished by inserting resistors 26 and 27 in the loop circuit connecting the rectifiers 18 and 19, now in electrical opposition, and connecting the midpoint of the resistors by means of the adjustable tap 22 to the resistor 20 at such a point that the voltages across the resistors 26 and 27 are equal for the center position or any arbitrary "zero" position of the reactor armature 6. In view of the opposed connection of the rectifiers, it will be apparent that the voltages across resistors 26 and 27, are in electrical opposition. Thus the potentials existing at the terminals 29 and 30 across which the voltmeter 28 is connected are equal. When the electrical outputs of the rectifiers 18 and 19 are unbalanced the voltages across the resistors 26 and 27 change oppositely, one increasing as the other decreases, and a voltage difference appears between the terminals 29 and 30, which is measured at the instrument 28. For proper operation, the value of the resistors 26 and 27 should be considerably higher than that of the balancing potentiometer resistor 20, but less than the resistance of the voltmeter. Capacitors such as 23, 24 and 25 may be arranged in Figs. 2 and 3 as in Fig. 1 if desired.

The three circuit arrangements function generally as follows: Movements of the reactor armature 6 unbalance the alternating magnetic fluxes per unit of magnetizing current linking the coils 4 and 5, the flux linkages per ampere in one coil increasing as the flux linkages per ampere in the other coil decreases, thereby changing the reactances of the reactor coils in opposite directions. This electrical change is reflected in the primary windings of the transformers as a current or voltage change which electrical change is reflected in the transformer secondary windings. Since the transformer primary windings are associated with oppositely changing reactor coil impedance the electrical quantities applied across the alternating current sides of the rectifiers 18 and 19 vary oppositely. This opposite variation is measured in the direct current sides of the rectifiers either as a current unbalance as in Figs. 1 and 2 or as a voltage unbalance as in Fig. 3. Voltage fluctuations at the source of alternating potential are largely compensated in the parallel circuit branches through the electrical bridge circuit and instrument circuits, the effect of voltage fluctuations at the source being least when the bridge circuit is in electrical balance. The symmetrical distribution of the electrical components of the system in a large measure compensates temperature response of the system elements while the specific temperature error of the rectifiers is compensated in resistance swamping by means of resistors 16 and 17, which can also be made oppositely responsive to temperature changes for exact compensation.

In each of the three embodiments of the invention, the rectifiers are so arranged that the currents circulating therein at bridge balance may be sufficiently high that linear rectifier operation may be had. When bridge unbalance occurs, the current in one rectifier rises while that in the other drops. Thus, bridge unbalance in either direction may be measured in the instrument circuits with center zero instruments and at no time, in accomplishing this, need the rectifier currents approach zero where the forward resistance of the rectifiers becomes increasingly high.

The foregoing disclosure and the showings made in the drawing are merely illustrative of the principles of this invention and are not to be interpreted in a limiting sense. The only limitations are to be determined from the scope of the appended claims.

I claim as my invention:

1. In a system for indicating a mechanical displacement, the combination of, an electrical bridge circuit, means for supplying alternating current to the electrical bridge circuit, reactor means including a pair of windings the reactances of which are varied in opposite directions in response to a mechanical displacement, said reactor windings being connected in adjacent legs of said bridge circuit, a pair of transformers each having primary and secondary windings, each of said primary windings being connected in series with one of said reactor windings in one of said adjacent legs of said bridge circuit to have the energization thereof varied according to the reactance change of one of said reactor windings, rectifier means connected across each of said secondary windings, and means responsive to the algebraic sum of the electrical outputs of said rectifiers.

2. In a system for indicating a mechanical displacement, the combination of, an electrical bridge circuit, means for supplying alternating current to the electrical bridge circuit, reactor means including a pair of windings the reactances of which are varied in opposite directions in response to a mechanical displacement, said reactor windings being connected in adjacent legs of said bridge circuit, a pair of transformers each having primary and secondary windings, each of said primary windings being connected in series with one of said reactor windings in one of said adjacent legs of said bridge circuit to have the energization thereof varied according to the reactance change of one of said reactor windings, a full-wave rectifier connected across each of said secondary windings, circuit means connecting the direct current sides of said rectifiers in series circuit relation, and an instrument connected across said series circuit between said rectifiers.

3. In a system for indicating a mechanical displacement, the combination of, an electrical bridge circuit, means for supplying alternating current to the electrical bridge circuit, reactor means including a pair of windings the reactances of which are varied in opposite directions in response to a mechanical displacement, said reactor windings being connected in adjacent legs of said bridge circuit, a pair of transformers each having primary and secondary windings, each of said primary windings being connected in series with one of said reactor windings in one of said adjacent legs of said bridge circuit to have the energization thereof varied according to the reactance change of one of said reactor windings, a full-wave rectifier connected across each of said secondary windings, circuit means connecting the direct current sides of said rectifiers in series circuit relation, resistance means in series in said series circuit, and an indicating instrument of lower resistance than said resistance means connected across said series circuit.

4. In a system for indicating a mechanical displacement, the combination of, an electrical bridge circuit, means for supplying alternating current to the electrical bridge circuit, reactor means including a pair of windings the reactances of which are varied in opposite directions in response to a mechanical displacement, said reactor windings being connected in adjacent legs of said bridge circuit, a pair of transformers each having primary and secondary windings, each of said primary windings being connected in series with one of said reactor windings in said adjacent legs of said bridge circuit to have the energization thereof varied according to the reactance change of one of said reactor windings, a full-wave rectifier connected across each of said secondary windings, circuit means connecting the direct current sides of said rectifiers in series circuit relation, a resistor connected in series in said series circuit, and an instrument connected across said series circuit, said instrument connection including a tap on said resistor for balancing the outputs of said rectifiers through said instrument when said bridge circuit is balanced.

5. In a system for indicating a mechanical displacement, the combination of, an electrical bridge circuit, means for supplying alternating current to the electrical bridge circuit, reactor means including a pair of windings the reactances of which are varied in opposite directions in response to a mechanical displacement, said reactor windings being connected in adjacent legs of said bridge circuit, a pair of transformers each having primary and secondary windings, each of said primary windings being connected in series with one of said reactor windings in said adjacent legs of said bridge circuit to have the energization thereof varied according to the reactance change of one of said reactor windings, a full-wave rectifier connected across each of said secondary windings, circuit means connecting the direct current sides of said rectifiers in electrical opposition and producing opposed voltages proportional to the electrical quantities energizing said rectifiers and means for measuring the algebraic sum of said voltages.

6. In a system for indicating a mechanical displacement, the combination of, an electrical bridge circuit, means for supplying alternating current to the electrical bridge circuit, reactor means including a pair of windings the reactances of which are varied in opposite directions in response to a mechanical displacement, said reactor windings being connected in adjacent legs of said bridge circuit, a pair of transformers each having primary and secondary windings, each of said primary windings being connected in series with said reactor windings in said adjacent legs of said bridge circuit to have the energization thereof varied according to the reactance change of one of said reactor windings, a full-wave rectifier connected across each of said secondary windings, a resistor connected across the direct current sides of each of said rectifiers and means for measuring the algebraic sum of the voltages across said resistors.

7. In a system for indicating a mechanical displacement, the combination of, a first electrical bridge circuit, means for supplying alternating current to the first electrical bridge circuit reactor, means including a pair of windings the reactances of which are varied in opposite directions in response to a mechanical displacement, said reactor windings being connected in adjacent legs of said first bridge circuit, a second bridge circuit including a full-wave rectifier in each of two adjacent legs thereof, means electrically connecting each of said rectifiers to be energized according to the electrical change in one of said adjacent legs of said first bridge circuit so that each adjacent leg has a rectifier connected therewith, and means responsive to the electrical change of the second bridge circuit.

THOMAS E. BROWNE, JR.

REFERENCES CITED

The following references are of record in the file of this patent:

UNITED STATES PATENTS

| Number | Name | Date |
|---|---|---|
| 2,394,079 | Langer | Feb. 5, 1946 |
| 2,299,997 | Ladrach | Oct. 27, 1942 |
| 2,240,184 | Hathaway | Apr. 29, 1941 |

FOREIGN PATENTS

| Number | Country | Date |
|---|---|---|
| 556,607 | Great Britain | Oct. 13, 1942 |